United States Patent Office.

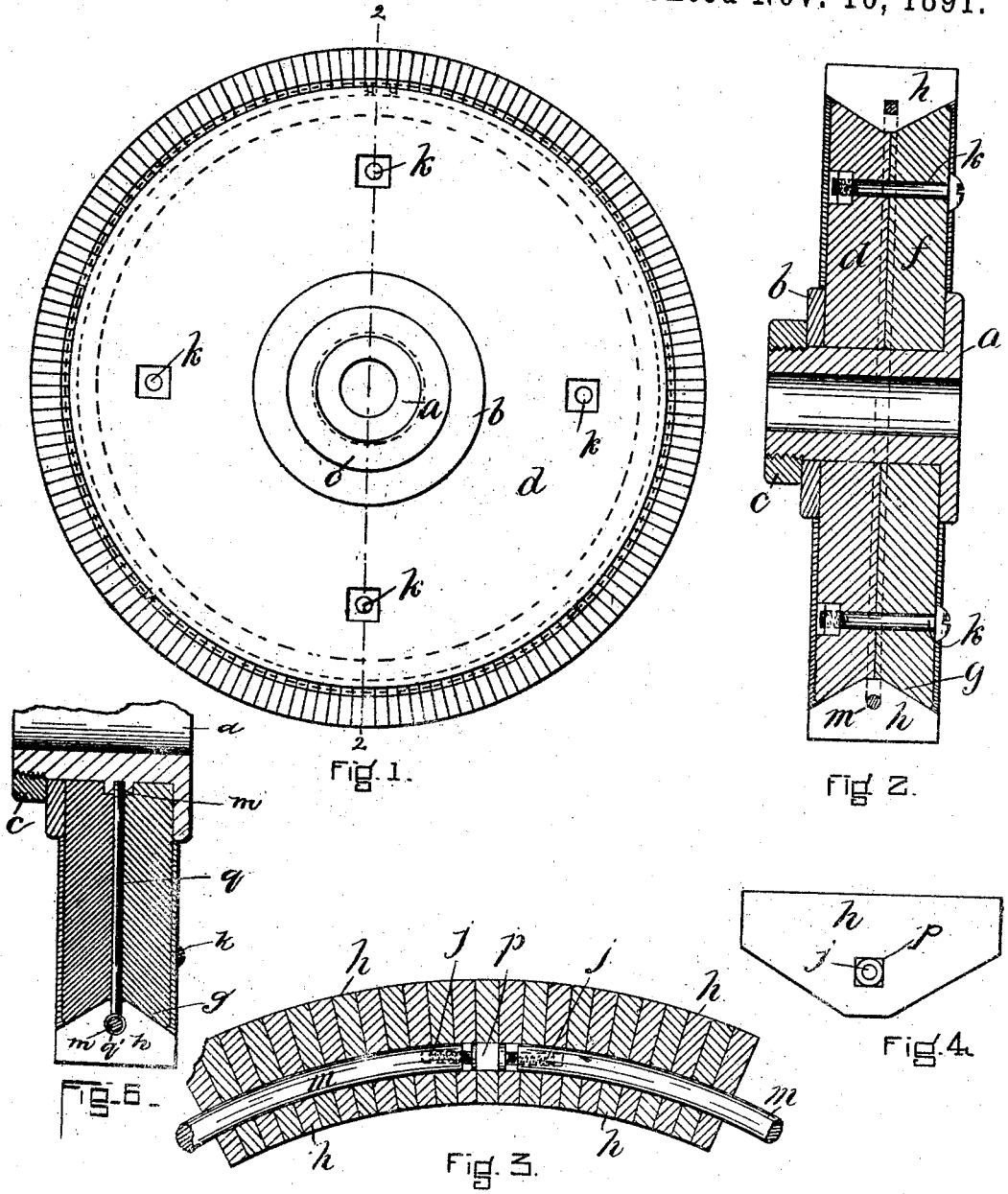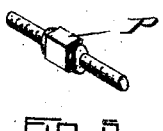

ALEXANDER R. YATES, OF WATERVILLE, MAINE, ASSIGNOR TO HIMSELF, AND WILLIAM A. YATES, OF VASSALBOROUGH, MAINE, AND SIDNEY D. SHATTUCK, OF MALDEN, AND GEORGE A. DRYSDALE, OF CHELSEA, MASSACHUSETTS.

POLISHING-WHEEL.

SPECIFICATION forming part of Letters Patent No. 463,129, dated November 10, 1891.

Application filed January 26, 1891. Serial No. 379,036. (No model.)

*To all whom it may concern:*

Be it known that I, ALEXANDER R. YATES, of Waterville, county of Kennebec, State of Maine, have invented certain new and useful Improvements in Polishing-Wheels, of which the following is a specification.

My invention relates more particularly to polishing-wheels of the type shown and described in Letters Patent of the United States No. 410,749, dated September 10, 1889, in which the periphery of the wheel is composed of a series of pieces of leather set radially and secured in place by means of a metallic ring or band which passes through each piece. Wheels of this description which have been previously made, so far as known to me, have been constructed with a continuous metallic ring or band, in which case the pieces of leather require to be slit to permit of their being placed upon the ring or band, or the ring or band has been soldered after the pieces of leather were placed upon it, which rendered it difficult or impossible to open or sever the ring and again unite it when it became necessary to replace any portion of the leather. As the leather pieces require to compactly fill the entire ring, it is necessary, if the ring be soldered, to slit one or more pieces of the leather and place them on the ring after it is soldered at the point where the solder is applied, and these pieces thus placed on the ring are, when the wheel is run at a high rate of speed, liable to be displaced and the wheel rendered valueless.

To avoid these objections is the object of my present invention, which consists in a polishing-wheel the periphery of which is composed of pieces of leather set radially and secured by a ring passing through each piece, the ends of the piece of metal forming the ring being joined by means of a connection in such manner that the ring may be closed or opened, as desired, all as more particularly set forth, and as is pointed out in the claims which are appended hereto and made a part hereof.

I have shown my invention in the accompanying drawings, to which reference is made in the following description, and in which—

Figure 1 is a side view of a polishing-wheel embodying my invention. Fig. 2 is a section on line 2 2, Fig. 1. Fig. 3 is a section of a portion of the periphery of the wheel, showing the pieces of leather which form the periphery, as also the retaining-ring and the device for closing the same. Fig. 4 is a detail showing the central portion of the connection which closes the ring as square to receive a piece of leather with a square hole therein. Fig. 5 is a detail view of the connection for the open ring. Fig. 6 is a sectional detail view to be referred to.

The hub of the wheel is shown at $a$, and is of metal or other suitable material. It is provided at one end with a flange and at the other with a washer or ring $b$ and a nut $c$, the latter being screwed onto the hub, as shown in Fig. 2, and serving to clamp the central portions $d\ f$ of the wheel firmly together. The inner edge of the central portions $d\ f$ is cut beveling, as shown at $g$, so that when these portions are together a V-shaped groove is formed in their peripheries, as shown, Fig. 2, for the reception of the correspondingly-shaped inner ends of the pieces of leather $h$, which are set radially thereon. To further strengthen the wheel and to secure the pieces $d\ f$ together, bolts $k$ may be inserted through the pieces $d\ f$, the bolts being preferably provided at one end with nuts, so that they may be taken out and the wheel taken to pieces to remove the leather periphery when that is desired for the purpose of renewing or repairing it. The pieces of leather $h$ are skived slightly at their inner edges toward the hub of the wheel in order that they may be set radially, the inner edges requiring to be slightly thinner, as they are on a shorter circle than the outer edges. A hole is punched in each piece of leather of a size sufficient to permit the insertion therein of a retaining ring or band $m$, which is preferably of metal, and a sufficient number of pieces of leather are strung on the ring $m$ to fill the ring when it is open. The ends of the open ring are each provided with a threaded socket $j$ to receive a right and left hand screw connection $p$, which operates when inserted to complete the ring and draw the ends together. This permits of the adjustment of the ring to increase or diminish its size slightly, and thus to crowd the pieces of leather h closely together when the ring is closed. The connection p is preferably made square in cross-section, as shown in Fig. 4, and a piece or pieces of hard leather of a size sufficient to fill the connection p—that is, of a thickness equal to the length of the squared portion of the connection—are placed thereon, and when the ring is closed this piece of leather may be used as a wrench to turn the connection and close the ring. In this way, when the ring is completed, it is covered completely with the pieces of leather, which are compactly placed thereon, and a periphery for the wheel is produced having a continuous surface of leather, and in which none of the pieces of leather are slitted, so that their liability to fly off or become displaced as the roll is speeded is reduced to a minimum.

It will be obvious that instead of squaring the connection p and placing thereon a piece of leather having a square hole which may be used as a wrench with which to turn the connection p the connection may be turned with an ordinary wrench or other suitable instrument, and the piece or pieces of leather necessary to cover it slitted and placed on the connection. In this way some of the advantages of my invention may be obtained. I prefer, however, the method first described, in which the connection p is squared and the piece or pieces of leather placed thereon are used to turn the connection and close the ring.

In cases where wheels are to be driven at a very high rate of speed it may be desirable to connect the ring m at two or more points by means of spokes or connections q with the hub. This may be done in any suitable manner, as by forming lugs m' on the hub and providing spokes q, extending from said lugs to the ring m, each of said spokes having at its outer end an eye q' encircling said ring. In such case the pieces of leather, as also the central portions d f of the wheel which adjoin the spokes, require to be slightly cut away to accommodate the spokes or connections q, as will be obvious. The central portions d f of the wheel are preferably made of indurated fiber—that is, wood fiber or paper-pulp molded to shape and indurated. They may, however, be made of wood or other suitable material.

I have spoken of the connection p as being squared—that is, the central portion thereof, which receives the piece or pieces of leather, being square in cross-section; but it will be obvious that the central portion of the connection may be of any shape in cross-section which will permit of the piece or pieces of leather being used to turn the connection—that is, the central portion of the connection may be of any shape in cross-section other than circular. The wheel may be built up by placing the part f on the hub, then placing the leather periphery, which has been previously formed in position, against the beveled edge of the part f, then placing the part d on the hub, and securing the whole together by the nut and washer on the hub and the screw-bolts k.

While I prefer to use pieces of leather for the periphery of my wheel which are only perforated and not slitted, yet I do not desire to limit my invention to the use of pieces of leather which are not slitted, as my retaining-ring may be used advantageously, especially for wheels which are not to be run at high speed, when the leather pieces are slitted from the perforation to the edge. Neither do I desire to limit myself to the use of leather only. Any polishing material—as, for example, felt—may obviously be employed.

What I claim is—

1. A polishing-wheel the periphery of which is composed of a number of pieces of leather set radially thereon and perforated, and a ring passing through said perforations and closed by means of a screw connection, substantially as and for the purpose described.

2. A polishing-wheel having its periphery composed of pieces of leather set radially thereon, and a ring passing through said pieces and closed by means of a screw connection, the central portion of the connection being squared and provided with a piece or pieces of leather having a square hole therein, substantially as and for the purpose set forth.

ALEXANDER R. YATES.

Witnesses:
R. WALLACE,
C. E. NOLTE.